(12) United States Patent
Garrett

(10) Patent No.: US 9,650,098 B2
(45) Date of Patent: May 16, 2017

(54) BICYCLE HANDLEBAR COVER

(71) Applicant: Tara Garrett, Brooklyn, NY (US)

(72) Inventor: Tara Garrett, Brooklyn, NY (US)

( * ) Notice: Subject to any disclaimer, the term of this patent is extended or adjusted under 35 U.S.C. 154(b) by 0 days.

(21) Appl. No.: 14/857,774

(22) Filed: Sep. 17, 2015

(65) Prior Publication Data

US 2016/0137248 A1 May 19, 2016

Related U.S. Application Data

(60) Provisional application No. 62/051,554, filed on Sep. 17, 2014.

(51) Int. Cl.
*B62J 23/00* (2006.01)
*B62J 33/00* (2006.01)

(52) U.S. Cl.
CPC .............. *B62J 23/00* (2013.01); *B62J 33/00* (2013.01)

(58) Field of Classification Search
CPC .. B62J 17/00; B62J 23/00; B62J 33/00; Y10T 74/20822; Y10T 74/20828; A41D 13/081; A41D 19/0037; A41D 2600/102
See application file for complete search history.

(56) References Cited

U.S. PATENT DOCUMENTS

| 1,333,872 | A | | 3/1920 | Overton | |
|---|---|---|---|---|---|
| 3,665,515 | A | | 5/1972 | Sjostrom, Sr. | |
| 4,141,567 | A | | 2/1979 | Scott | |
| 4,856,112 | A | * | 8/1989 | Effle | A41D 13/08 2/16 |
| 5,740,700 | A | | 4/1998 | Redmond | |
| 7,708,298 | B1 | * | 5/2010 | Folsom | B62J 27/00 150/167 |
| 8,776,267 | B2 | * | 7/2014 | Narboni-Campora | A41D 13/085 2/158 |
| 9,198,473 | B2 | * | 12/2015 | Thompson | A41D 19/01 |
| 2015/0329162 | A1 | * | 11/2015 | Small, Jr. | F16B 1/0014 74/551.8 |

FOREIGN PATENT DOCUMENTS

| KR | FR 2604868 A1 * | 4/1988 | .......... A41D 13/085 |
|---|---|---|---|
| WO | WO 2012/127070 A1 * | 9/2012 | |

OTHER PUBLICATIONS

Machine translation of FR 2604868 A1 obtained on Jun. 6, 2016.*

* cited by examiner

*Primary Examiner* — Adam D Rogers
(74) *Attorney, Agent, or Firm* — Global Intellectual Property Agency, LLC; Daniel Boudwin

(57) ABSTRACT

A pair of covers (one for each of the cyclist's hands) is provided. Once applied to the handlebars, the user inserts their hand into the mitt via an opening thereon. The opening preferably includes elastic thereon to fit tightly around the user's wrist. In this way, the present invention prevents a user's hands from becoming wet and slippery when biking in the precipitation. Further, the device keeps a cyclist's hands warm in cold weather, and reduces the friction and chafing caused by gripping wet handlebars.

4 Claims, 5 Drawing Sheets

BICYCLE HANDLEBAR COVER

CROSS REFERENCE TO RELATED APPLICATIONS

This application claims the benefit of U.S. Provisional Application No. 62/051,554 filed on Sep. 17, 2014. The above identified patent application is herein incorporated by reference in its entirety to provide continuity of disclosure.

FIELD OF THE INVENTION

The present invention relates to devices that cover and protect a bicyclist's hands while they are in contact with the bicycle handlebars.

BACKGROUND OF THE INVENTION

Bicycling is a mode of transportation that is popular for commuting and recreation. While cold or wet weather may be less than ideal conditions for some bicyclists, many would nonetheless still like to ride. However, inclement weather poses certain technical challenges to bicyclists, especially with regard to the handlebars of the bike. Wet handlebars can be dangerously slippery or may cause a person's hands to chafe and blister. In cold weather, the handlebars can be unpleasantly cold to the touch, which can be painful and distracting while driving. It would therefore serve bicyclists to have a device that alleviates the discomfort and danger of wet or cold handlebars while still allowing ready access to controls such as the brakes and shifting mechanism.

Devices are known in the prior art that relate to handlebar hand covers. One device provides a hand cover made of a flexible material that attaches to a set of handlebars. The device includes a waterproof exterior with a lined interior. Another device provides a shroud that attaches over a set of handlebars to protect the hands from wind and precipitation (e.g. rain, snow, sleet, and hail). These devices, however, do not disclose a handlebar cover comprising a waterproof and breathable fabric material that is placed over the handlebars, thereby providing a shelter for a user's hands while riding the bicycle.

SUMMARY OF THE INVENTION

In view of the foregoing disadvantages inherent in the known types of hand protections for bicyclists now present in the prior art, the present invention provides a bicycle handlebar cover that is configured to provide shelter for a bicyclist's hands. The bicycle handlebar cover comprises a clamp that attaches to the handlebar. The clamp is a semi-rigid, substantially elongated, c-shaped body that runs longitudinally along the handlebar. Attached to the clamp is the mitt that accommodates the bicyclist's hand. The mitt is built from waterproof, breathable fabric. The mitt includes holes to accommodate handbrake and handbrake lever and it extends over the gear shifter.

A pair of covers (one for each of the cyclist's hands) is provided. Once applied to the handlebars, the user inserts their hand into the mitt via an opening thereon. The opening preferably includes elastic thereon to fit tightly around the user's wrist. In this way, the present invention prevents a user's hands from becoming wet and slippery when biking in the precipitation. Further, the device keeps a cyclist's hands warm in cold weather, and reduces the friction and chafing caused by gripping wet handlebars. The waterproof, breathable fabric can also wick sweat away from the bicyclist's hand, keeping them more comfortable in the summer.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
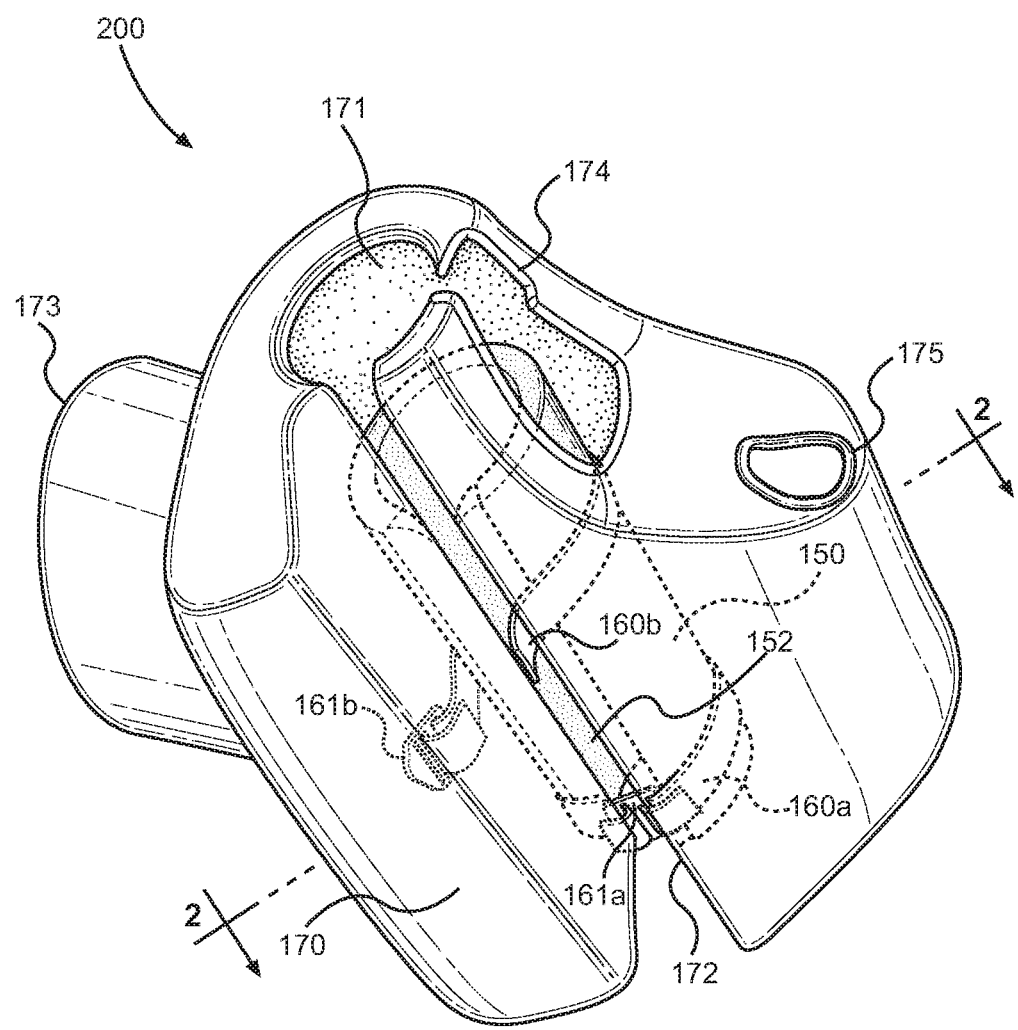
FIG. 1 shows a perspective view from underneath of a left-handed bicycle handlebar cover of the present invention.

Reference is made herein to the attached drawings. Like reference numerals are used throughout the drawings to depict like or similar elements of the bicycle handlebar cover. The figures are intended for representative purposes only and should not be considered to be limiting in any respect.

Referring now to FIG. 1, there is shown a perspective view from underneath of a left-handed bicycle handlebar cover 200 of the present invention. The present handlebar cover 200 comprises two major components: a clamp 150 and a mitt 170. The clamp 150 is a substantially tubular piece with a longitudinal opening, or channel 152. The tubular shape of the clamp forms a hollow recess that can accept the bicycle handlebar 100. The channel 152 is oriented substantially inferiorly when the bicycle handlebar cover is installed on the handlebar for normal use. The clamp 150 is configured to accept the distal end of the handlebar therein, thereby causing the cover 200 to run lengthwise along the handlebar when placed thereon. The cover 200 is sized to accept the hand of a bicyclist therein.

The clamp can be fabricated from any semirigid or substantially rigid material. Semirigid foams are suitable materials. Specific examples of materials known in the art are polyurethane and high-density polyethylene. The material provides a degree of flexibility, so that the clamp 150 can be widened without any special tools and placed around the handlebar. To place the clamp about the handlebar, the user can widen the channel with his or her hands, place the clamp around the handlebar, release the clamp, and allow it to resume its substantial c-shape. Once the clamp is placed about the handlebar 100, it can be secured thereto by any means known in the art. Depicted in FIG. 1 are two straps 160a, 160b with buckles 161a, 161b that the bicyclist can adjust to secure the cover to the bicycle handlebar.

The cover 200 further comprises a mitt 170 that is configured to accept a user's hand therein. The ends of the mitt fabric 192, 194 are affixed to edges of the clamp channel 158, 159 by methods known in the art. The fabric of the mitt can be stitched to the edge of the clamp. The fabric of the mitt can also be affixed with glue or other adhesive. The mitt 170 extends slightly longer than the clamp along the length of the handlebar. This allows the user to place the bicycle handlebar cover over the handlebar and secure it by tightening the straps. At the medial end and lateral end of the mitt are c-shaped ends 171 and 172 respectively to which the ends of the fabric forming the mitt can be affixed. The medial end 171 of the mitt extends beyond the gear shifter 180, so that the bicyclist can keep his or her hand covered while he or she shifts gears.

In addition to the terminal ends, the mitt contains three openings: one rear-facing 173 for the bicyclist to insert his hand into the mitt; one 174 to accommodate the handbrake mount to the handlebar; and one 175 to accommodate the brake lever 120. The rear facing opening 173 can contain one or more elastic bands that run circumferentially about the opening. Such band or bands serve to tighten the opening around the wrist of the bicyclist. This, in turn, keeps cold air and precipitation away from the user's wrist.

Figure 2:
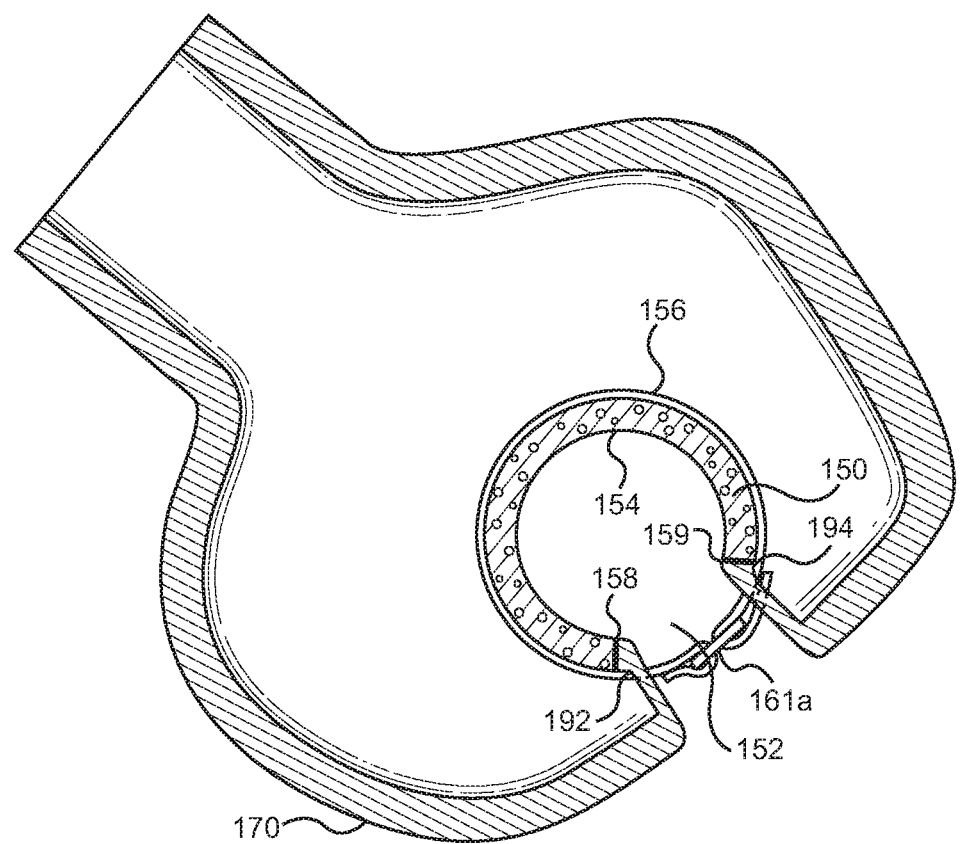
FIG. 2 shows a cross-section of left-handed bicycle handlebar cover taken at the line indicated on FIG. 1.

Referring now to FIG. 2, there is shown a cross-sectional view of the cover taken at the line indicated in FIG. 1 and facing laterally. The two major components are the clamp 150 and the mitt 170. The clamp 150 contains an exterior surface 156 facing the bicyclist's hand and an interior surface 154 facing the handlebar. The ends 192, 194 of the fabric meet the ends of the clamp 158, 159 and are affixed thereto. Running circumferentially about the clamp 150 is a strap 160*a*. The clamp 150 accommodates a bicycle handlebar (not shown) and is secured to it by applying tension to the strap 160*a* and pulling the ends of the strap through a buckle 161*a*. The mitt 170 contains a void that can accommodate a bicyclist's hand.

Figure 3:
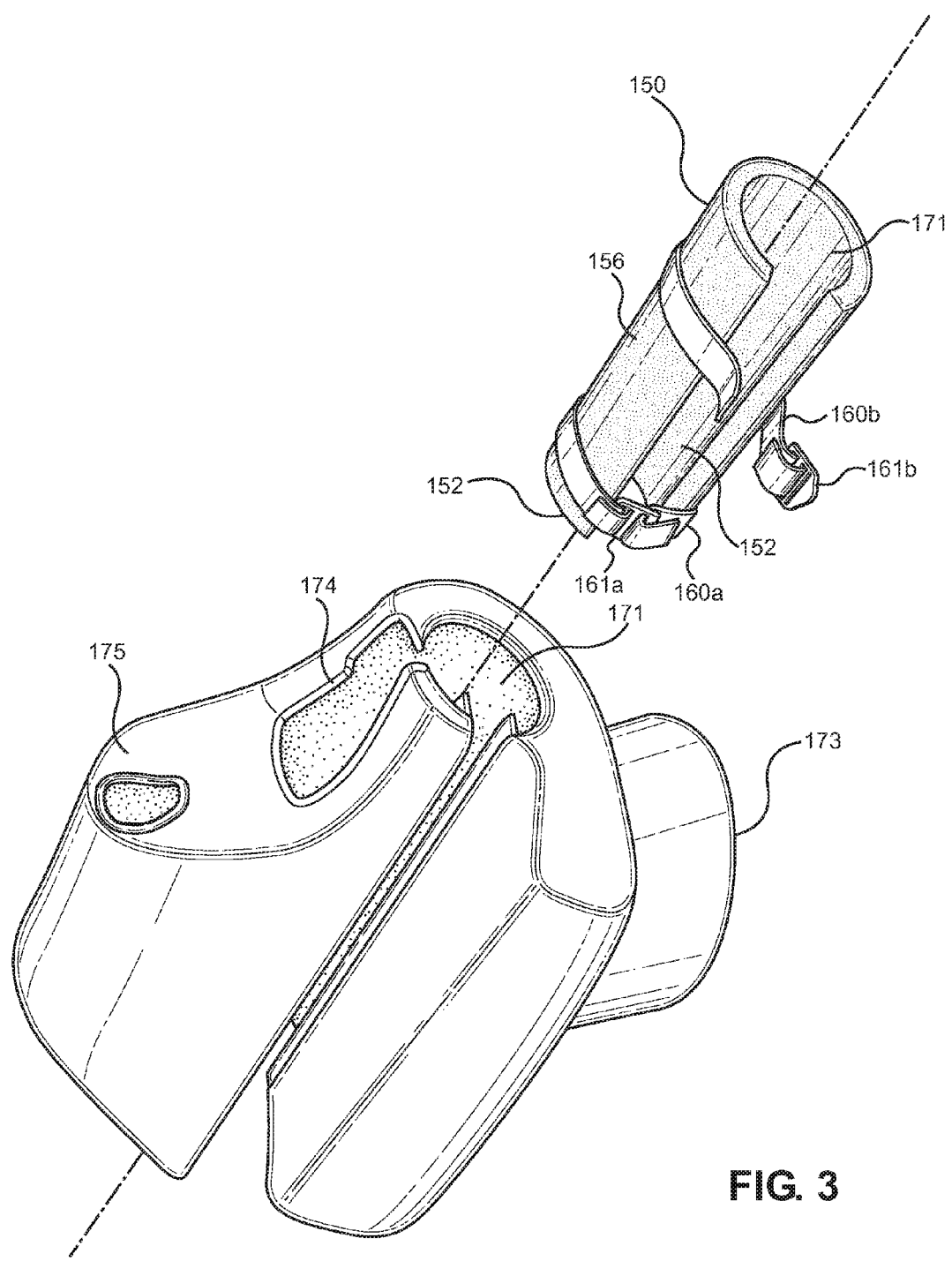
FIG. 3 shows an exploded view of a right-handed bicycle hand cover including the clamp and mitt.

Referring now to FIG. 3, there is shown an exploded view of a right-handed bicycle hand cover including the clamp 150 and mitt 170. The clamp 150 has an exterior surface 156; an interior surface 154 and a channel 152 that runs lengthwise. Running around the clamp 150 are two straps 160*a* and 160*b*. Each strap has a corresponding buckle 161*a*, 162*b* for tightening the strap about a bicycle handlebar and securing it thereto.

Figure 4:
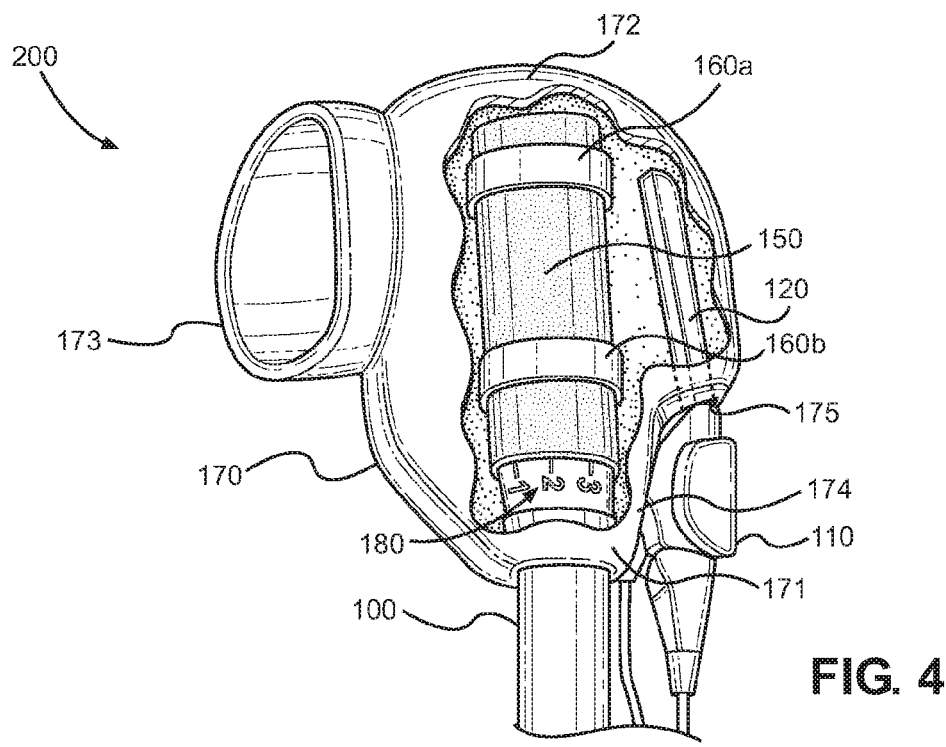
FIG. 4 shows a cutaway view of a left-handed bicycle hand cover.

Referring now to FIG. 4, there is shown a cutaway view of a left-handed bicycle cover. The waterproof, breathable fabric of the mitt 170 is cut away to expose the clamp and straps underneath. The function of the openings 174, 175 is made apparent here. The opening 174 accommodates the handbrake 110 where it is mounted to the handlebar. The opening 175 accommodates the handbrake lever 120 where it extends into the interior of the mitt.

Bikes typically include a mechanism for shifting gears so that the bicyclist can adjust the size of the gears to adapt to different terrain. Shifting gears allows the bicyclist to continue to deliver power efficiently to the bicycle. "Twist shifters" known in the art can be operable by rotating the handle itself, or a dial thereupon. The gear shifter dial 180 is located adjacent to the clamp on its medial side. The clamp 150 does not extend over the gear shifter 180. However, the mitt 170 does.

Figure 5:
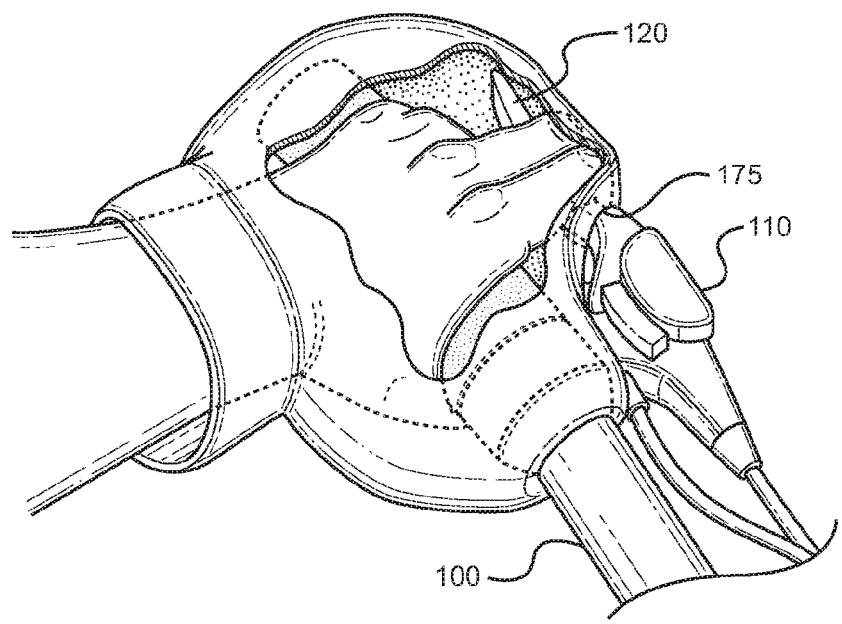
FIG. 5 shows a cutaway view of a left-handed bicycle hand cover that includes the bicyclist's hand.

Referring now to FIG. 5, there is shown a partial cutaway view, of the bicyclist's hand inside of a left-handed bicycle handlebar cover of the present invention. The mitt 170 has sufficient room about the brake lever so that the bicyclist can wrap his fingers around the front of the brake lever 120 and actuate the brakes.

Figure 6:
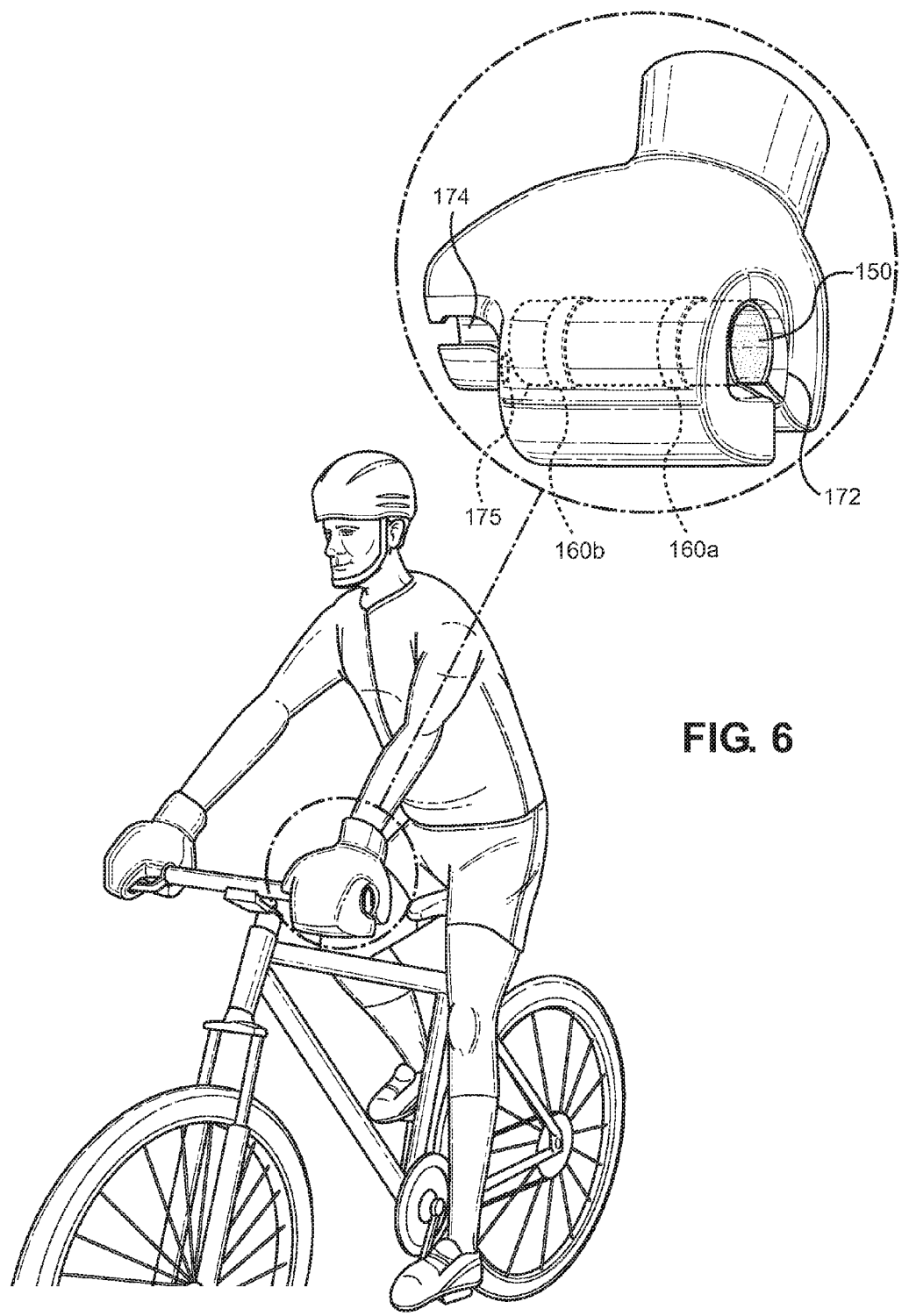
FIG. 6 shows a perspective view and close-up a left-handed bicycle handlebar cover of the present invention.

FIG. 6 shows a perspective view of a left-handed bicycle handlebar cover of the present invention, including a close-up of the cover 200. Visible is the lateral end 172 of the mitt and the opening 174 for the handbrake mount to the handlebar. The ends 192, 194 of the fabric forming the mitt are visible where they join the edges 158, 159 of the clamp 150.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hand cover comprising:
    a clamp configured to extend at least partially around the circumference of a handlebar of a bicycle;
    a mitt, attached to the clamp, composed of a waterproof, breathable fabric, the mitt including:
    a rear-facing opening configured to receive a hand;
    an opening configured to accommodate a handbrake where it mounts on the handlebar; and
    an opening configured to accommodate a lever of the handbrake.

2. The hand cover of claim 1, wherein the clamp is configured to be secured to the handlebar by one or more fabric straps.

3. The hand cover of claim 1, wherein the mitt is affixed to the clamp by adhesive.

4. The hand cover of claim 1, wherein the mitt is affixed to the clamp by stitching.

\* \* \* \* \*